Oct. 5, 1937.  J. W. ANDERSON  2,094,732
WINDSHIELD WIPER
Original Filed Nov. 14, 1931
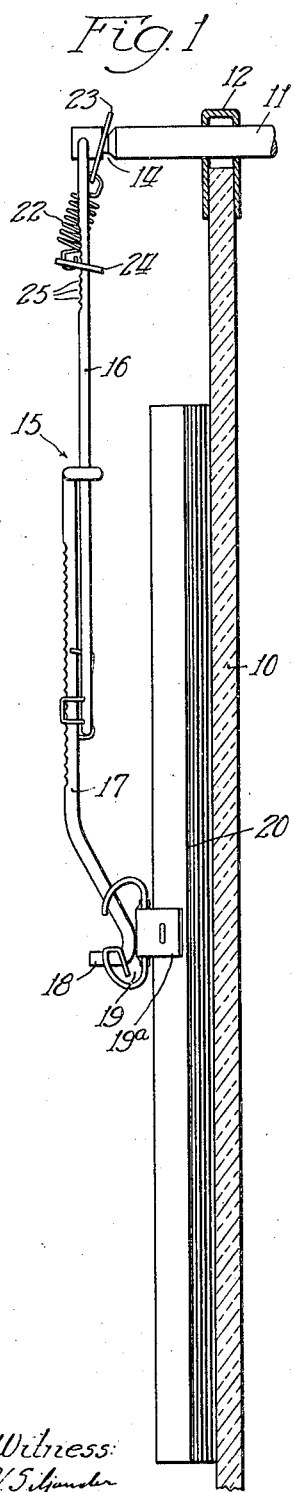
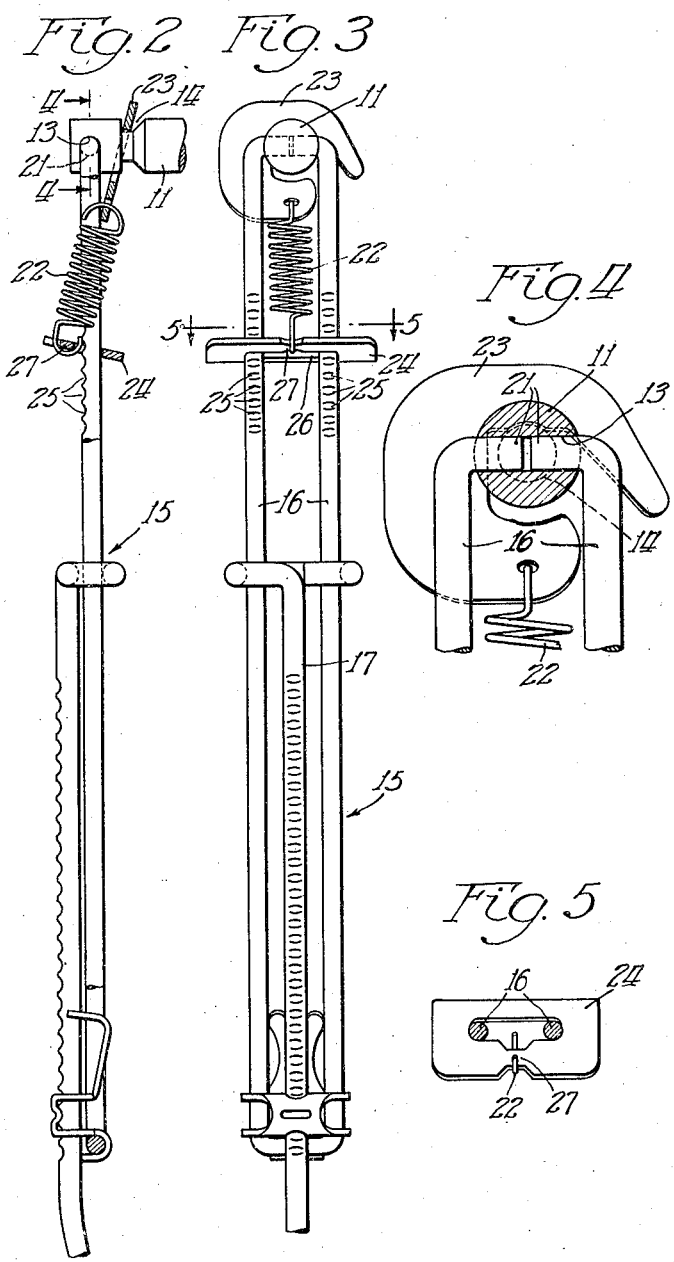
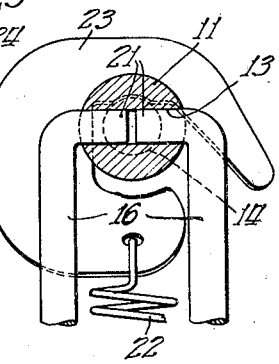
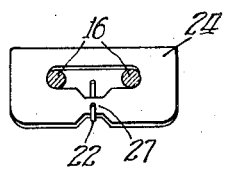
Witness:
V. Siljander
Inventor:
John W. Anderson
By:
Hill & Hill, Attys.

Patented Oct. 5, 1937

2,094,732

UNITED STATES PATENT OFFICE 2,094,732

WINDSHIELD WIPER

John W. Anderson, Gary, Ind.

Original application November 14, 1931, Serial No. 574,967, now Patent No. 2,043,218, dated June 9, 1936. Divided and this application August 8, 1935, Serial No. 35,352

4 Claims. (Cl. 15—255)

This invention relates to a windshield wiper, and particularly to the arm and mounting therefor by which the arm and wiping element are supported and operatively connected to an actuating member such as a shaft or other suitable device.

The present application is a division of my application, Serial No. 574,967, filed November 14, 1931, for Windshield wiper, now Patent No. 2,043,-218, issued June 9, 1936.

One object of the present invention is to provide a wiper arm having resilient means associated therewith for urging the arm and wiping element toward the windshield, and wherein a novel construction and arrangement is provided for varying the tension of said resilient means.

Another object of the invention is to provide a wiper arm strong enough to carry loads encountered in service without breakage of the arm adjacent to the shaft or other actuating member.

Another object of the invention is to provide a wiper arm which may be readily applied to and disconnected from its actuating member, and wherein the resilient means associated with the arm may be conveniently positioned, and the tensioning means therefor readily adjusted.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a side view of my improved wiper arm mounting illustrating its application to a wiper arm and actuating member operatively related to a windshield;

Fig. 2 is an enlarged side view of the improved mounting and arm shown in Fig. 1 with some of the parts broken away to more clearly illustrate certain portions of the structure;

Fig. 3 is a front elevation of the structure shown in Fig. 2, taken as viewed from the left side thereof;

Fig. 4 is an enlarged longitudinal sectional elevational view taken substantially as indicated by line 4—4 of Fig. 2; and Fig. 5 is a plan sectional view taken substantially as indicated by the line 5—5 of Fig. 3.

In the drawing, 10 designates a windshield having a wiper arm actuating member 11 shown, in the present instance, as a supporting shaft rotatably mounted in the frame 12 of the windshield and provided with arm receiving portions shown, in the present instance, as the end portions of a transversely extending aperture or recess 13 formed adjacent the outer end of the shaft, and with a notch or annular groove 14 shown, in the present instance, as formed in the periphery of and extending around the shaft 11 in spaced relation to the aperture 21 and between the aperture and the windshield.

The wiper arm, shown in the drawing, and indicated as a whole by the numeral 15, comprises an inner section 16 and an outer section 17 slidably mounted on the inner section and extending beyond the lower end thereof, the extreme outer or lower end of the outer section 17 being provided in the present instance with a hook portion 18 adapted to engage a connector, indicated as a whole by the numeral 19, on which is mounted a clip or holder 19a adapted to receive a windshield wiper element or blade 20 positioned adjacent and adapted for engagement with the surface of the windshield 10.

The inner section 16 of the wiper arm 15 is shown, in the present instance, as formed of relatively stiff resilient round stock or wire bent into substantially U-shaped formation, the legs of which are shown as provided adjacent their upper ends with relatively movable portions, shown as laterally and inwardly extending angular extensions or projections 21 adapted, respectively, to engage the respective ends of the aperture or recess 13 at opposite sides of the shaft 11 in a manner, in the present instance, to rotate therein and permit the arm 15 to swing in a plane substantially parallel to the axial line of the shaft 11 and perpendicular to the windshield. By such an arrangement, it will be observed that the angular projections 21 of the arm section 16 positioned in opposite ends of the aperture 13, divide the operating load at these points of engagement with the shaft 11 between the two cross-sectional areas approximately equal to the cross-sectional area of the aperture, thereby obtaining greater durability than is ordinarily obtained by a structure wherein the entire load is carried by single cross-sectional area of the driven member or arm as is the case in various present devices, and which are subject to frequent breakage at a point near the connection of the arm with the operating shaft.

For yieldingly urging the wiper arm 15 and wiping element 20 toward the windshield 10, a spring 22 is connected at one of its end portions to an open sided hook 23 adapted to engage the groove 14 as clearly shown in Figs. 1 and 2, and at its opposite end, is connected to a yoke 24 slidably mounted on and operatively related to the inner section 16 at a point remote from the projections 21 or pivotal axis thereof.

For varying the tension of the spring 22 in a manner to vary the pressure of the wiping element 20 on the windshield 10, the inner section 16 of the arm 15 is provided with a roughened portion shown, in the present instance, as a plurality of notches 25 formed in the respective leg portions of the U-shaped inner section 16 and spaced longitudinally thereof. The yoke member 24 is shown, in the present instance, as provided with a central opening 26 adapted to loosely receive the legs of the inner section 16 in a manner to prevent rotation of the yoke on the inner section and retain the projections 21 in engagement with the recess on aperture 13, and it will be observed that by connecting the spring 22 to one side of the yoke 24 as clearly shown at 27 in Figs. 2 and 3, the tension of the spring 22 will cause a cramping of the yoke on the section 16 and cause one of the margins of the opening 26 to engage the notches 25 and retain the yoke in relatively fixed position with respect to the arm section 16. It will be observed also that by moving the yoke 24 longitudinally of the section 16 in a manner to engage the various notches 25 formed therein, that the spring 22 may be variously tensioned for exerting various degrees of pressure of the wiping element 20 on the windshield 10.

In assembling the arm 15 with the shaft 11, the outer section 17 may be moved downwardly to adjacent its extreme outer position and the yoke 24 slid downwardly along the inner section 16 to adjacent the upper end of the outer section 17, thereby permitting the upper or free ends of the member 16 to be separated and the inwardly extending projections 21 to be inserted in opposite ends of the recess or aperture 13, after which the yoke 24 may be moved upwardly into approximately its normal operative position adjacent the roughened portion or notches 25 and the hook 23 placed in the groove 14, after which the outer section 17 of the arm may be moved to desired position and the yoke adjusted to proper position in one of the notches 25 to obtain the desired spring tension for exerting suitable pressure of the wiper blade 20 on the surface of the windshield. It will be observed that by such an arrangement, the projections 21 are secured against accidental displacement from within the aperture 13 and that an efficient and secure connectoin between the arm and operating shaft is obtained which prevents the arm from working out of the aperture as frequently occurs in various devices at present in use.

It will be observed from the foregoing description that the present invention provides a novel and efficient structure whereby the wiper arm may be readily connected and detached from its actuating member, and that the pressure of the wiper element on the windshield may be readily varied. It will be observed also that the arm and the pressure varying means may be readily applied to and disconnected from the actuating member for convenience in cleaning and making replacements or repairs of the various parts.

Obviously, the present invention is not limited to the precise construction and arrangement shown and described, as the same may be variously modified. Moreover, all the features of the invention need not be used conjointly, as the same may be used to advantage in variously different combinations and sub-combinations.

What I claim as new and desire to secure by Letters Patent is:

1. In a device of the class described and in combination, an arm section having a pair of substantially parallel legs, a rotatable supporting shaft having a notch formed therein and having an aperture extending therethrough between said notch and the end of said shaft, said legs having inwardly extending relatively movable projections rotatably mounted in said aperture, a yoke surrounding and adjustably mounted on said legs for securing said projections against displacement from said aperture, and resilient means connected to said yoke and to said shaft at the notch formed therein.

2. In a device of the class described and in combination, an arm section comprising a pair of substantially parallel spaced legs having a roughened portion formed thereon, a rotatable supporting shaft having an annular groove formed therein and having an aperture extending therethrough between said notch and the end of said shaft, said legs being relatively movable and having inwardly extending projections rotatably mounted in said aperture, a yoke surrounding and adjustably mounted on said legs adjacent said roughened portions for securing said projections against displacement from said aperture, and resilient means extending between said legs and connected to said yoke and to an open-sided hook positioned in said groove.

3. A device of the class described and in combination, an arm having a pair of substantially parallel legs, a rotatable actuating member having a notch therein and having an aperture extending therethrough between said notch and the end of said actuating member, said legs having relatively movable laterally extending projections rotatably mounted in the opposite end portions of said aperture, a manually actuated yoke surrounding said legs for securing said projections against displacement from said aperture, and resilient means connected at one of its ends to said yoke at the opposite side of said legs from said notch and at its opposite end to said actuating member at the notch formed therein.

4. In a device of the class described and in combination, a rotatable supporting shaft having a notch formed therein and having an aperture extending therethrough between said notch and the end of said shaft, an arm section comprising a pair of substantially parallel relatively movable spaced legs having inwardly extending projections rotatably mounted in said aperture, said legs having a roughened portion formed thereon at the opposite side thereof from said notch, a yoke surrounding and adjustably mounted on said legs adjacent said roughened portions for securing the projections against displacement from said aperture, and resilient means connected at one of its ends to a portion of said yoke adjacent the roughened side of said legs and at its opposite end to said shaft at the notch formed therein.

JOHN W. ANDERSON.